(12) United States Patent
Sasaki

(10) Patent No.: US 10,135,267 B2
(45) Date of Patent: Nov. 20, 2018

(54) SECONDARY BATTERY SYSTEM

(71) Applicant: HITACHI AUTOMOTIVE SYSTEMS, LTD., Hitachinaka-shi, Ibaraki (JP)

(72) Inventor: Hironori Sasaki, Tokyo (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 156 days.

(21) Appl. No.: 14/900,702

(22) PCT Filed: May 28, 2014

(86) PCT No.: PCT/JP2014/064046
§ 371 (c)(1),
(2) Date: Dec. 22, 2015

(87) PCT Pub. No.: WO2014/208253
PCT Pub. Date: Dec. 31, 2014

(65) Prior Publication Data
US 2016/0149420 A1 May 26, 2016

(30) Foreign Application Priority Data
Jun. 28, 2013 (JP) .................. 2013-135872

(51) Int. Cl.
*H02J 7/00* (2006.01)
*B60L 11/18* (2006.01)
(Continued)

(52) U.S. Cl.
CPC ......... *H02J 7/0021* (2013.01); *B60L 11/1859* (2013.01); *B60L 11/1862* (2013.01);
(Continued)

(58) Field of Classification Search
CPC ........ H02J 7/007; H02J 7/0021; H02J 7/0016; H02J 7/0014; H02J 7/0052; H02J 7/0019; H02J 7/0047
See application file for complete search history.

(56) References Cited

U.S. PATENT DOCUMENTS

| 2010/0123436 A1 | 5/2010 | Herrod et al. |
| 2012/0065824 A1 | 3/2012 | Takahashi et al. |

(Continued)

FOREIGN PATENT DOCUMENTS

| JP | 2002-359009 A | 12/2002 |
| JP | 2002359009 | * 12/2002 |

(Continued)

OTHER PUBLICATIONS

European Search Report for Application No. 14818778.4, dated Feb. 24, 2017.

*Primary Examiner* — Drew A Dunn
*Assistant Examiner* — Sailesh Thapa
(74) *Attorney, Agent, or Firm* — Volpe and Koenig, P.C.

(57) ABSTRACT

Provided is a secondary battery system capable of suppressing degradation of a battery capacity. When it is determined that a battery pack is brought into a non-use state, a battery state detection unit in a battery controller compares an SOC of the battery pack calculated by a battery state operation unit and a standard SOC. When the SOC of the battery pack is higher than the standard SOC, the battery state detection unit in the battery controller calculates a capacity value in which the SOC of the battery pack becomes lower than the standard SOC, from a difference of the SOC of the battery pack and the standard SOC, and transmits the calculated capacity value to a cell controller. The cell controller discharges the battery pack, on the basis of the capacity value transmitted from the battery state detection unit.

6 Claims, 16 Drawing Sheets

(51) Int. Cl.
*H01M 10/42* (2006.01)
*H01M 10/44* (2006.01)

(52) U.S. Cl.
CPC ..... *B60L 11/1879* (2013.01); *H01M 10/4207* (2013.01); *H01M 10/441* (2013.01); *B60L 2240/545* (2013.01); *B60L 2240/547* (2013.01); *B60L 2240/549* (2013.01); *H02J 7/007* (2013.01); *Y02T 10/705* (2013.01); *Y02T 10/7005* (2013.01); *Y02T 10/7044* (2013.01)

(56) References Cited

U.S. PATENT DOCUMENTS

2012/0293129 A1* 11/2012 Naghshtabrizi .............. 320/118
2014/0375279 A1* 12/2014 Nishino ................ H01M 10/44
320/160

FOREIGN PATENT DOCUMENTS

| JP | 2003-235106 A | | 8/2003 |
| JP | 2003235106 | * | 8/2003 |
| JP | 2012-143151 A | | 7/2012 |
| JP | 2013118753 | * | 6/2013 |
| WO | 2010056488 A1 | | 5/2010 |
| WO | 2013/046690 A1 | | 4/2013 |
| WO | 2013/080628 A1 | | 6/2013 |

\* cited by examiner

SECONDARY BATTERY SYSTEM

TECHNICAL FIELD

The present invention relates to a secondary battery system.

BACKGROUND ART

It is demanded for a lithium ion secondary battery mounted on a moving object such as a vehicle to show stable performance over a long period. However, in the lithium ion secondary battery, a battery capacity may be degraded and a life of the battery may be decreased according to a use method or a storage method thereof.

The invention to suppress the degradation of the battery capacity by storing a manganese-type lithium ion secondary battery using lithium manganate in a positive electrode material in a specific state of charge (SOC) is disclosed in PTL 1.

CITATION LIST

Patent Literature

PTL 1: Japanese Patent Application Laid-Open No. 2012-143151

SUMMARY OF INVENTION

Technical Problem

The battery capacity of the lithium ion secondary battery is degraded due to a negative electrode as well as a positive electrode. The life of the battery needs to be increased by suppressing the degradation of the negative electrode as well as the positive electrode.

Solution to Problem

A secondary battery system according to the invention of Claim 1 is for controlling charge/discharge of one or more battery packs, wherein a negative electrode active material of the battery pack is a material having a first potential stabilized phase and a second potential stabilized phase of an SOC lower than an SOC of the first potential stabilized phase as stabilized phases in which a potential with respect to the SOC is almost constant, and the secondary battery system includes an SOC control device that executes at least discharge control of the battery pack such that the SOC of the battery pack becomes a value in a range of the second potential stabilized phase, at least when the battery pack is brought into a non-use state, on the basis of a use state of the future of the battery pack.

Advantageous Effects of Invention

According to the invention, a life of a secondary battery included in a secondary battery system can be increased.

DESCRIPTION OF EMBODIMENTS

First Embodiment

Figure 1:
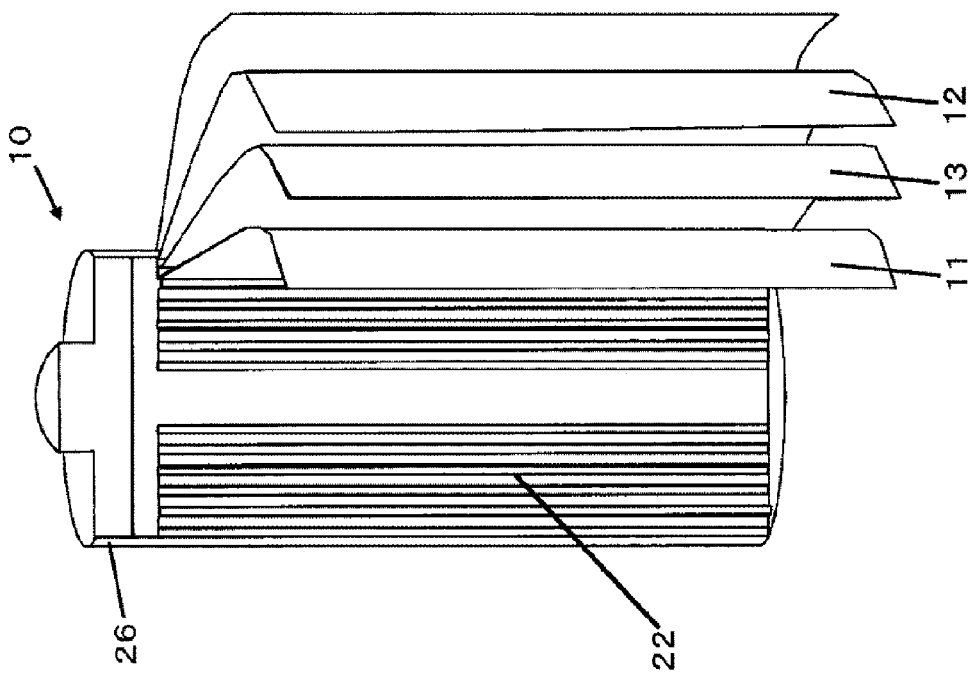
FIG. 1 is a notch diagram of a part of a secondary battery used in a secondary battery system according to the present invention.

FIG. 1 illustrates a cylindrical lithium ion secondary battery 10 (hereinafter, simply referred to as a battery 10) used in a secondary battery system according to the present invention. A wound electrode group 22 manufactured by winding a positive electrode plate 11 using a composite lithium oxide as an active material and a negative electrode plate 12 using a material holding lithium ions as an active material in a spiral shape with a separator 13 therebetween is accommodated in a battery container 26 of the battery 10, together with a predetermined electrolyte.

As examples of the positive electrode active material coated on the positive electrode plate 11, lithium cobaltate and a modified material (resultant obtained by dissolving aluminum or magnesium as a solid solution in the lithium cobaltate) thereof, lithium nickelate and a modified material (resultant obtained by partially substituting cobalt for nickel) thereof, lithium manganate and a modified material thereof, and composite oxides (nickel, cobalt, and manganese) thereof can be used. In addition, an olivine-type compound or a spinel-type lithium manganese compound can be used individually or a combination thereof can be used.

As examples of a conductive material for a positive electrode, carbon black such as acetylene black, ketjen black, channel black, furnace black, lamp black, and thermal black, and various graphites can be used individually or a combination thereof can be used.

As examples of a binder for the positive electrode, polyvinylidene fluoride (PVDF), a modified material of the polyvinylidene fluoride, polytetrafluoroethylene (PTFE), and a particulate rubber binder having acrylate units can be used. At this time, an acrylate monomer or an acrylate oligomer introduced with a reactive functional group can be mixed with the binder.

As the negative electrode active material coated on the negative electrode plate 12, various natural graphites, artificial graphites, silicone-type composite materials such as silicide, and various metal plastic materials can be used or materials obtained by mixing the various natural graphites, the artificial graphites, the silicone-type composite materials, and the various metal plastic materials with amorphous carbon (hardly graphitizable carbon and easily graphitizable carbon) can be used. In addition, materials obtained by mixing hard carbon and the various natural graphites with each other can be used as the negative electrode active material.

As a binder for a negative electrode, various binders including the PVDF and the modified material thereof can be used. However, it is preferable to use a styrene-butadiene copolymer (SBR) and a modified material thereof in combination with cellulose-type resins including carboxymethyl cellulose (CMC) or with addition of a small amount of cellulose type resins, from the viewpoint of improvement of acceptance nature of lithium ion.

At this time, as examples of a conductive material for the negative electrode, carbon black such as acetylene black, ketjen black, channel black, furnace black, lamp black, and thermal black, and various graphites can be used individually or a combination thereof can be used.

The separator is not limited particularly as long as the separator has a composition endurable within a range of use of the lithium ion secondary battery. However, microporous films of an olefin type such as polyethylene and polypropylene are used individually or in a composite manner for the separator generally and preferably. A thickness of the separator is not limited particularly and is preferably 10 to 40 μm.

For the electrolyte, various lithium compounds such as $LiPF_6$ and $LiBF_4$ can be used as an electrolyte salt. In addition, ethylene carbonate (EC), dimethyl carbonate (DMC), and diethyl carbonate (DEC) can be used individually as a solvent or a combination thereof can be used as the solvent. In addition, vinylene carbonate (VC), cyclohexyl benzene (CHB), and modified materials thereof are preferably used to form a superior film on the positive electrode and the negative electrode and ensure stability at the time of over-charge or over-discharge.

A shape of a wound electrode group in this embodiment may be a cylindrical shape having a circular cross-section, an oblongly cylindrical shape having an elliptical cross-section, or a prismatic shape having a rectangular cross-section.

In addition, the battery container to fill the wound electrode group is not limited particularly. However, battery containers having superior strength, corrosion resistance, and workability, for example, a battery container in which plating is performed on iron for corrosion resistance and a battery container made of stainless steel are preferably used. In addition, aluminum alloys or various engineering plastics and metals can be used together.

Figure 2:
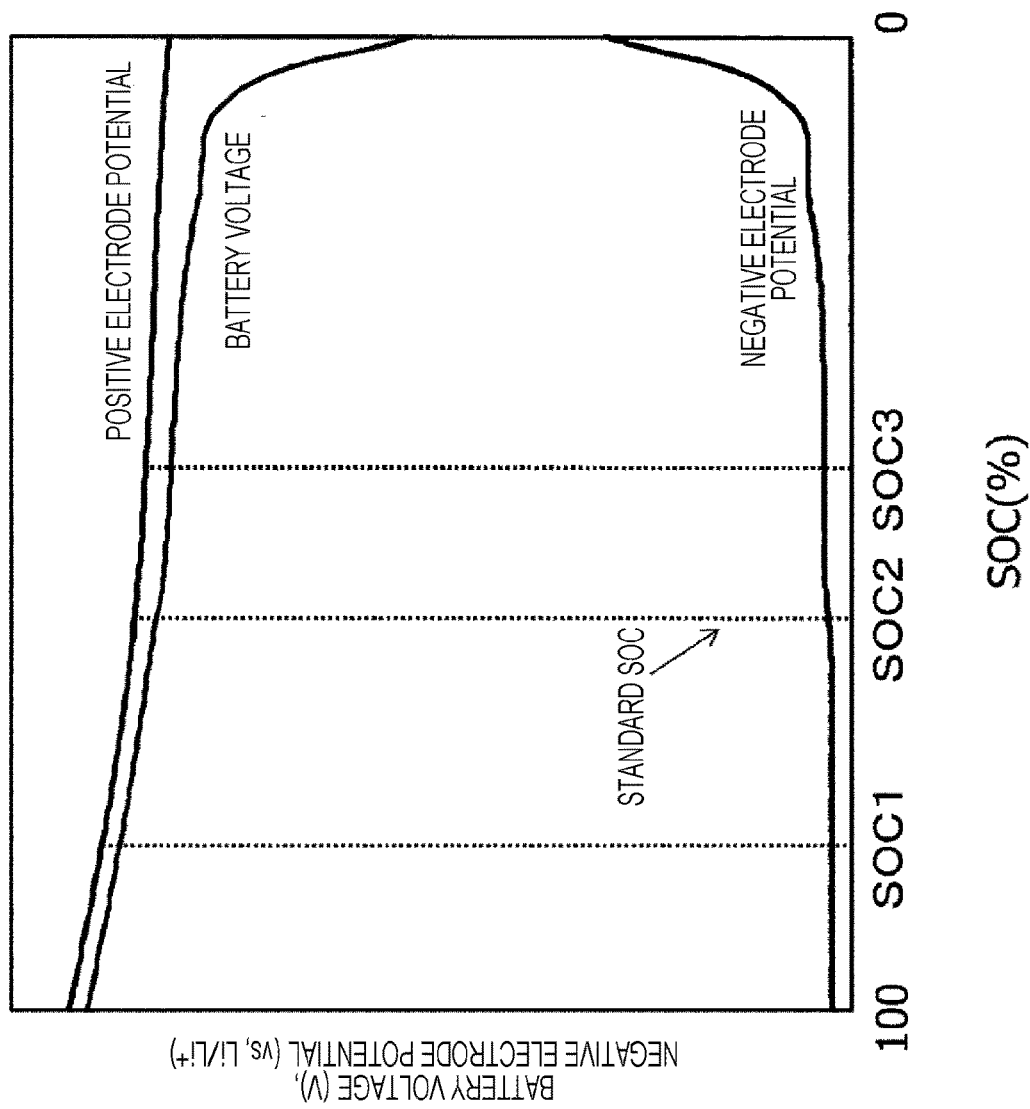
FIG. 2 is a diagram illustrating potentials of a positive electrode and a negative electrode and a battery voltage of the secondary battery used in the secondary battery system according to the present invention, with respect to an SOC.
Figure 3:
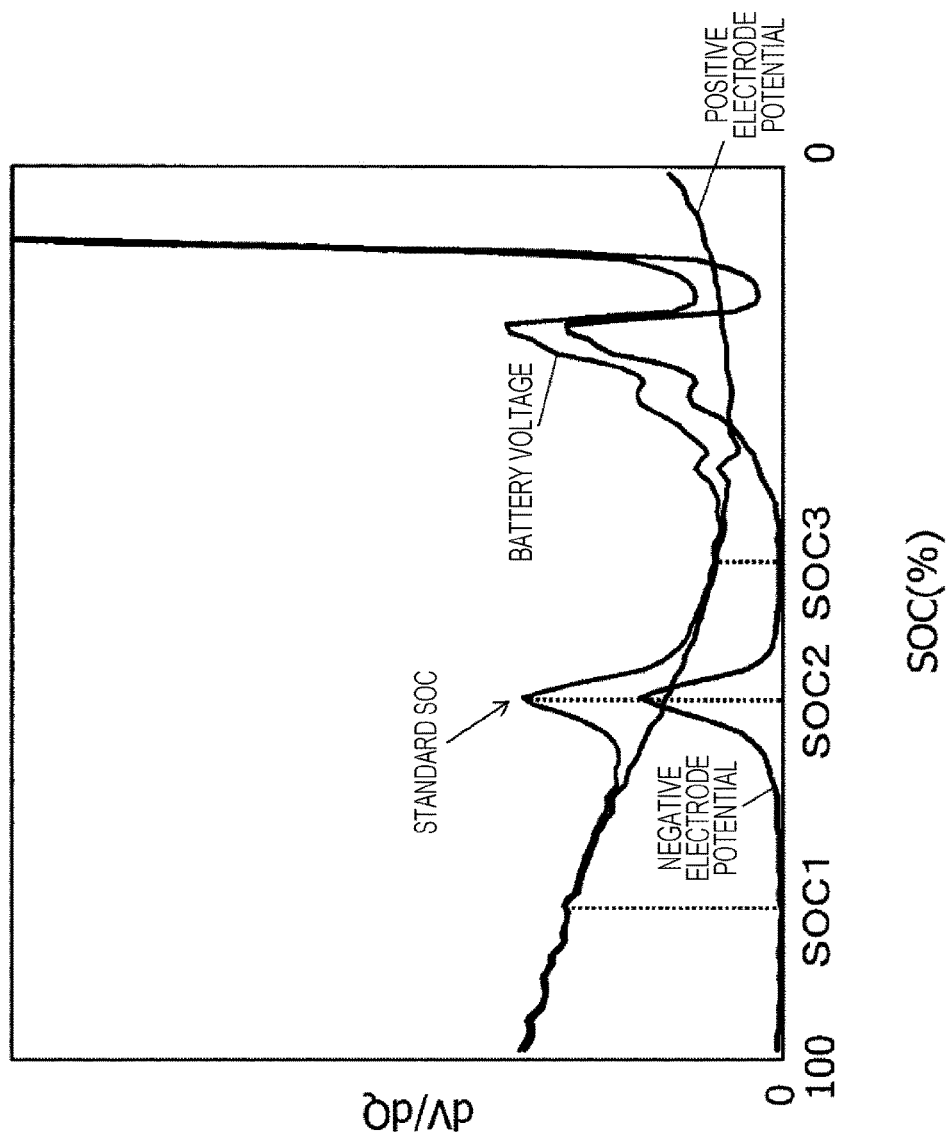
FIG. 3 is a diagram illustrating differential curves of the potentials of the positive electrode and the negative electrode and the battery voltage of the secondary battery used in the secondary battery system according to the present invention.

FIG. 2 is a curve showing dependency of a positive electrode potential, a negative electrode potential, and a battery voltage to be a potential difference thereof in the battery 10 used in the secondary battery system according to the present invention, with respect to an SOC. FIG. 3 is a discharge differential curve (SOC-dV/dQ) corresponding to the curve illustrated in FIG. 2 and this shows a change rate of the curve illustrated in FIG. 2 with respect to the SOC. For electrode materials of the battery 10, the layered lithium manganate is used in the positive electrode active material, the carbon black is used in the conductive material, and the polyvinylidene fluoride is used in the binder. The natural graphite is used in the negative electrode active material and a material obtained by mixing the styrene-butadiene copolymer (binder resin) and the carboxymethyl cellulose at a ratio of 98:1:1 is used in the binder. As the battery 10, a cylindrical battery having a size in which a diameter is 18 mm and a length is 65 mm is used.

The differential curve of the negative electrode potential illustrated in FIG. 3 has regions showing values close to zero at both sides of a peak in an SOC value shown by an SOC2, respectively. The regions showing the values close to zero are regions in which a change rate of the negative electrode potential is almost equal to zero and become flat portions (plateau) in the negative electrode potential curve illustrated in FIG. 2. Here, a flat portion having an SOC higher than the SOC2 is set as a first flat portion and an SOC value in the first flat portion is set as an SOC1. A flat portion having an SOC lower than the SOC2 is set as a second flat portion and an SOC value in the second flat portion is set as an SOC3. The SOC2 is called a standard SOC as described below.

In addition, in a state (first potential stabilized phase) shown by the first flat portion and a state (second potential stabilized phase) shown by the second flat portion, methods of taking lithium ions into the negative electrode active material are different. For this reason, the method of taking the lithium ions is changed, so that the SOC changes from the first potential stabilized phase to the second potential stabilized phase via the standard SOC (SOC2).

The differential curve of the positive electrode potential of FIG. 3 continuously shows a value other than zero. From this, it can be known that the potential changes monotonously, that is, decreases monotonously according to a decrease in the SOC, in the positive electrode potential curve of FIG. 2.

The battery voltage is a difference of the positive electrode potential and the negative electrode potential. In addition, a differential curve of the battery voltage is a difference of the differential curve of the positive electrode potential and the differential curve of the negative electrode potential. In FIG. 3, a peak appears in the differential curve of the negative electrode potential and the peak does not appear in the differential curve of the positive electrode potential. For this reason, it is thought that the peak appearing in the differential curve of the battery voltage is derived from the negative electrode potential. In FIG. 2, the battery voltage curve mainly behaves in a manner derived from the positive electrode in the SOC regions of the first and second flat portions, by the first and second flat portions existing in the negative electrode potential curve and the positive electrode potential curve changing monotonously.

Figure 4:
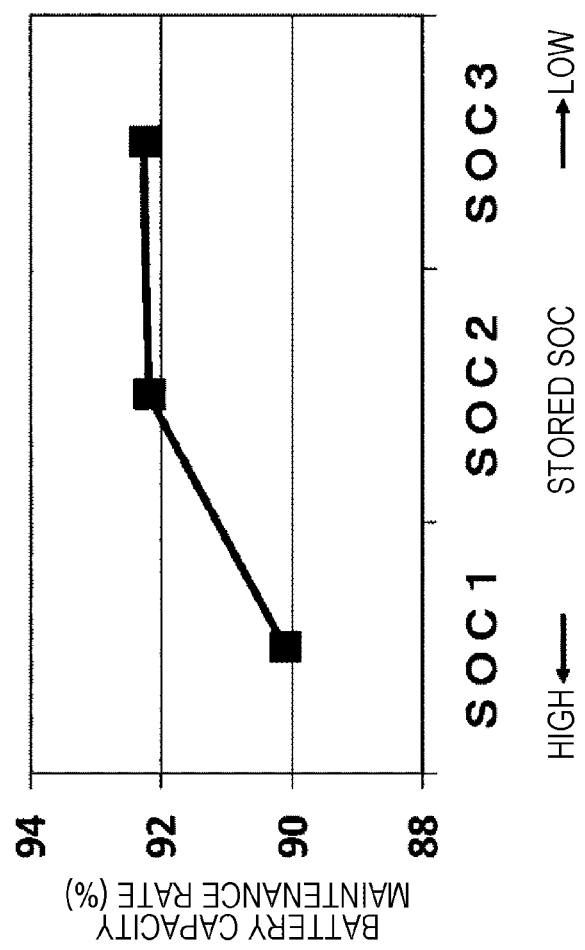
FIG. 4 is a diagram illustrating a battery capacity maintenance rate with respect to a storage SOC.

FIG. 4 illustrates a battery capacity maintenance rate in the case in which a storage SOC is set as the SOC1, the SOC2, or the SOC3, a storage temperature is set as 50° C., and the battery is stored for 80 days. Here, the battery capacity maintenance rate is a value obtained by dividing a battery capacity after the battery is stored and tested during a predetermined period by an initial battery capacity and shows a degradation degree of the battery capacity.

When the battery is stored in the SOC2 or the SOC3, the capacity maintenance rate of about 92% is shown. However, when the battery is stored in the SOC1, the capacity maintenance rate of about 90% is shown. From this, it can be known that, if the battery is stored in a storage SOC equal to or lower than the SOC2, the capacity maintenance rate becomes hard to decrease, that is, the battery capacity becomes hard to be degraded. As such, because the SOC2 means an SOC becoming a standard in which the battery capacity becomes hard to be degraded or becomes easy to be degraded, the SOC2 is called a "standard SOC".

From the above, it can be known that the battery 10 needs to be stored in the SOC equal to or lower than the standard SOC (SOC2) to prevent the degradation of the battery capacity in the battery 10 used in the secondary battery system according to this embodiment.

Figure 5:
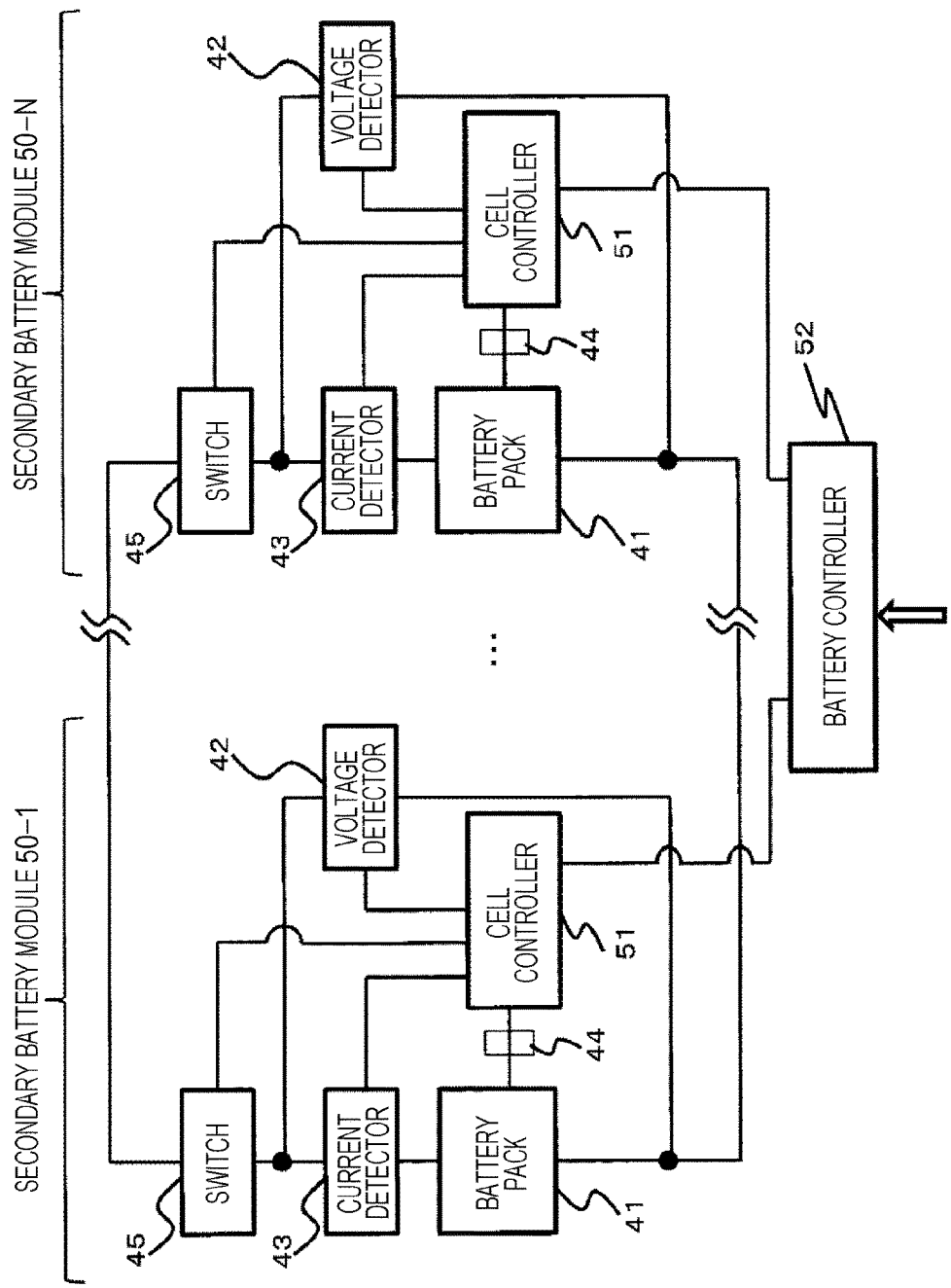
FIG. 5 is a schematic configuration diagram of the secondary battery system according to the present invention.

FIG. 5 is a system block diagram of the secondary battery system according to this embodiment. A storage apparatus is configured such that N (particularly, N is an integer of 1 or more) secondary battery modules 50-1 to 50-N are connected in parallel and charge/discharge of the N secondary battery modules 50-1 to 50-N is controlled by one battery controller 52. Each of the secondary battery modules 50-1 to 50-N includes a battery pack 41, a voltage detector 42 to detect a voltage of the battery pack 41, a current detector 43 to detect a current of the battery pack 41, a temperature detector 44 to detect a temperature of the battery pack 41, a switch device 45 to perform charge and discharge of a plurality of single batteries 10 configuring the battery pack 41 independently, and a cell controller 51 to control each of charge and discharge of the battery pack 41.

The battery pack 41 is configured by connecting the plurality of single batteries 10 illustrated in FIG. 1 in series. However, the battery pack 41 may be a battery pack in which the plurality of single batteries are connected in series and a battery pack in which the plurality of single batteries are connected in parallel. In addition, when the secondary battery module is configured by connecting the N battery packs 41 in series, a positive electrode of the battery pack 41 having a highest potential and a negative electrode of the battery pack 41 having a lowest potential are connected to a load such as an electric motor via an inverter.

The current detector 43 detects a current of each of the single batteries 10 configuring the battery pack 43. The current detector 43 can use a galvanometer, an element using a shunt resistor, and a clamp meter. However, the current detector 43 is not limited thereto.

The temperature detector 44 detects a temperature of the battery pack 41. The temperature detector 44 can use a thermocouple and a thermistor, for example. However, the temperature detector 44 is not limited thereto. The temperature detector 44 measures a surface temperature and an internal temperature of the battery pack 41, a surface temperature of a casing accommodating the battery pack, or a peripheral temperature of the battery pack 41, so that the temperature detector 44 can use the measured temperature as a temperature of the battery pack.

Each of the cell controller 51 and the battery controller 52 (both the cell controller and the battery controller are called an SOC control device. Hereinafter, this is the same) has a CPU, a ROM, a RAM, and other peripheral circuits. An arrow added to the battery controller 52 means that a command from an upper controller (not illustrated in the drawings) having a determiner to determine a use state of the future of the battery pack 41 is received by the battery controller 52. The cell controller 51 executes charge/discharge control of the single battery 10, for example, balancing control by a predetermined program, according to a command from the battery controller 52, and controls an SOC of each single battery 10 to a predetermined value. Therefore, it may be thought that the SOC of the battery pack 41 is equivalent to the SOC of the plurality of single batteries 10 configuring the battery pack 41. That is, characteristics of FIGS. 2 and 3 are characteristics of the single battery 10. However, it is thought that characteristics of the battery pack 41 are equivalent to the characteristics.

The secondary battery system according to this embodiment stores the SOC of the battery pack 41 illustrated in FIG. 1 as a value smaller than the standard SOC2, so that degradation of the battery capacity at the time of storage is suppressed. The cell controller 51 detects a charge/discharge voltage and a charge/discharge current of each battery pack 41 by the voltage detector 42 and the current detector 43, operates the SOC of each battery pack 41, and controls the SOC of the battery pack 41 and the SOC of each single battery 10 to a value smaller than the standard SOC2, at the time of not using the storage apparatus, for example, at the time of storage.

The cell controller 51 also operates a cumulative charge/discharge electric amount and reads a signal of the surface temperature of the single battery detected by the temperature detector 44.

A timer is embedded in the battery controller 52 and measures a time regarding charge/discharge of the battery pack 41, for example, a time after starting discharge.

Figure 6:
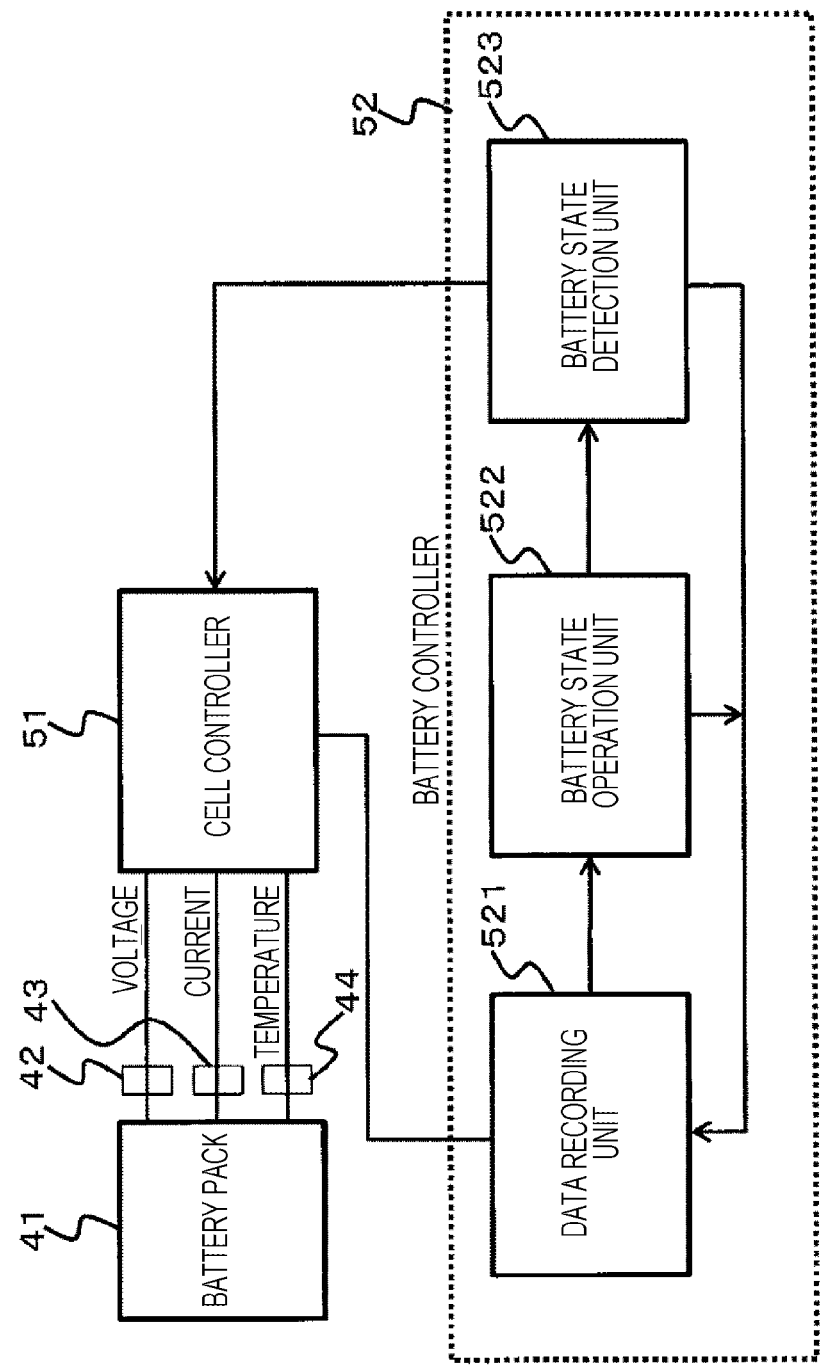
FIG. 6 is a schematic configuration diagram of the secondary battery system according to the present invention.

A configuration and an operation of the battery controller 52 illustrated in FIG. 5 are illustrated using a system block diagram of FIG. 6. Data of a voltage, a current, a temperature, a time regarding the charge/discharge, and a capacity calculated from the current and the time in the battery pack 41 is transmitted from the cell controller 51 to a data recording unit 521 of the battery controller 52. Data is operated by a battery state operation unit 522, on the basis of the data received by the data recording unit 521. In a battery state detection unit 523, a battery state is detected from an operation result from the battery state operation unit 522. A state of charge (SOC) of the battery is determined according to a detection result and an SOC determination result is transmitted to the cell controller 51. The cell controller 51 controls the switch 45 according to the SOC determination result and controls a charge/discharge current value.

Figure 7:
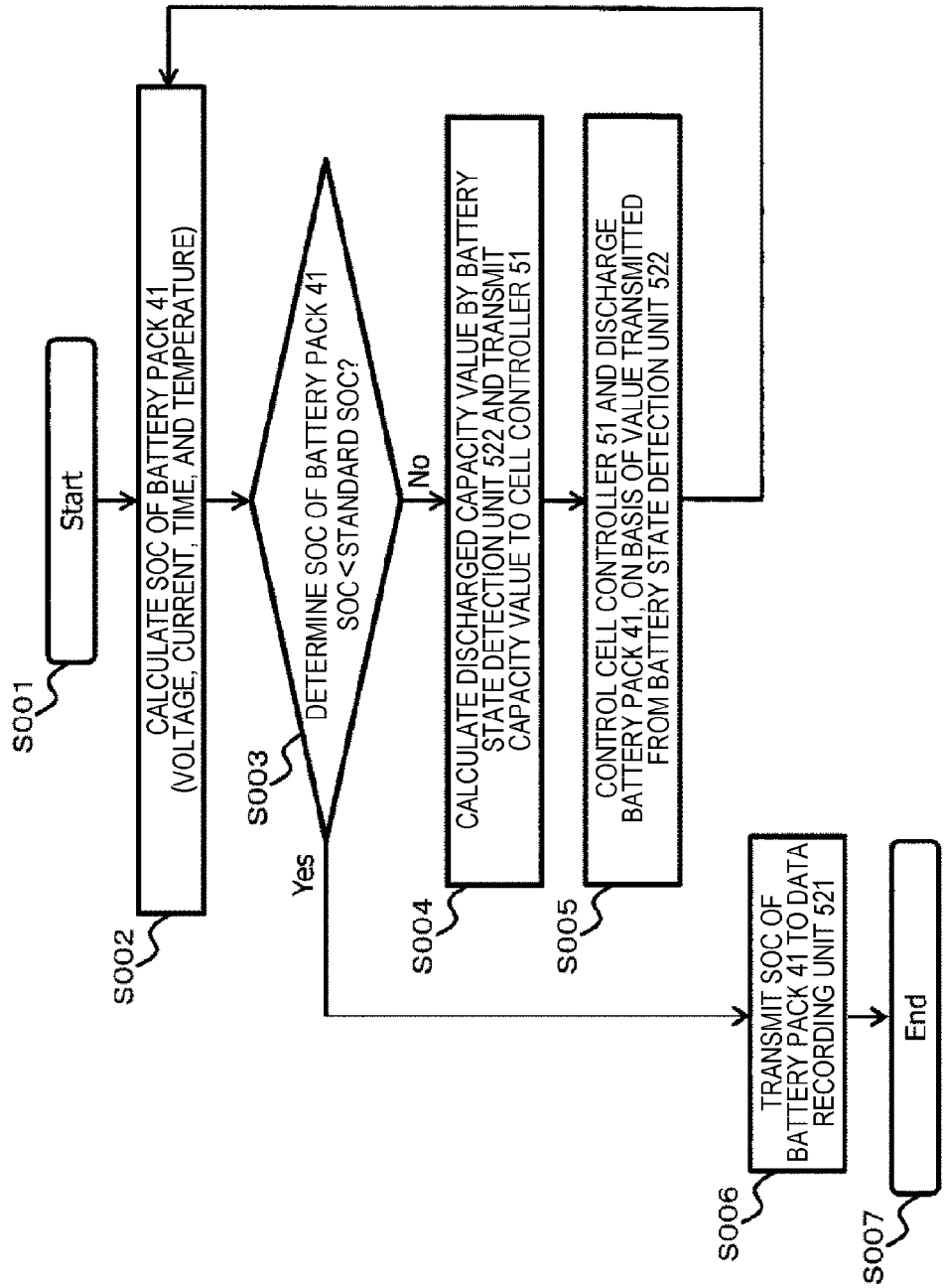
FIG. 7 is a system flow diagram according to a first embodiment.

A discharge control method of the battery controller 52 will be described using a flow diagram of the secondary battery system according to the embodiment of the present invention illustrated in FIG. 7. First, when a period in which discharge is not performed for a constant time is generated, a signal is sent from the cell controller 51 to the battery controller 52 (step S001).

In step S002, the battery state operation unit 522 in the battery controller 52 calculates the SOC of the battery pack 41, on the basis of data of a battery voltage V detected by the voltage detector 42, a discharge current I detected by the current detector 43, and a battery temperature T detected by the temperature detector 44.

In step S003, the battery state detection unit 523 in the battery controller 52 compares the SOC of the battery pack 41 calculated by the battery state operation unit 522 and the standard SOC. When the SOC of the battery pack 41 is lower than the standard SOC, the battery state detection unit 523 determines a comparison result as Yes and the process proceeds to step S006. If the SOC of the battery pack 41 is equal to or higher than the standard SOC, the battery state detection unit 523 determines the comparison result as No and the process proceeds to step S004.

In step S004, the battery state detection unit 523 in the battery controller 52 calculates a capacity value in which the SOC of the battery pack 41 becomes lower than the standard SOC, from a difference of the SOC of the battery pack 41 and the standard SOC, and transmits the calculated capacity value to the cell controller 51.

In step S005, the cell controller 51 discharges the battery pack 41, on the basis of the capacity value transmitted from the battery state detection unit 523. The corresponding discharge capacity is discharged to an auxiliary machine executing temperature control of the battery system or a different battery (a lead battery for starting an engine). After the discharge is completed, the process proceeds to step S002 and the SOC of the battery pack 41 is calculated. After the process proceeds to step S003, the determination is performed again.

In step S006, a value of the SOC of the battery pack 41 is transmitted to the data recording unit 521 in the battery controller 52 and the process proceeds to step S007.

In step S007, control of the battery controller 52 ends.

Figure 8:
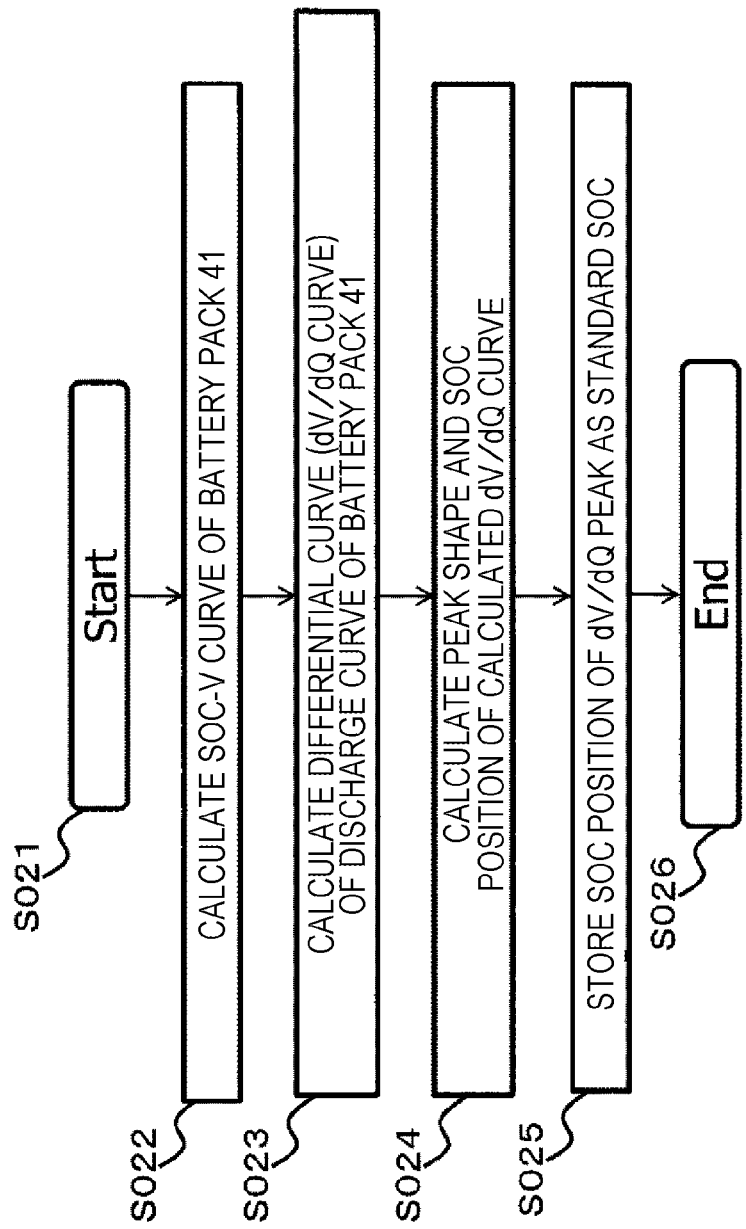
FIG. 8 is a system flow diagram according to the first embodiment.

FIG. 8 is a system flow diagram illustrating a method of calculating the standard SOC necessary for the SOC determination. When the battery capacity of the battery 10 in the battery pack 41 decreases due to aging, it is necessary to select the standard SOC again. Hereinafter, a control method of the cell controller 51 and the battery controller 52 when the standard SOC is selected again will be described.

In step S021, when a constant period passes after selection of the standard SOC such as maintenance of the secondary battery system or when a reselection command of the standard SOC is transmitted from the outside, the battery controller 52 starts a reselection process of the standard SOC.

Figure 9:
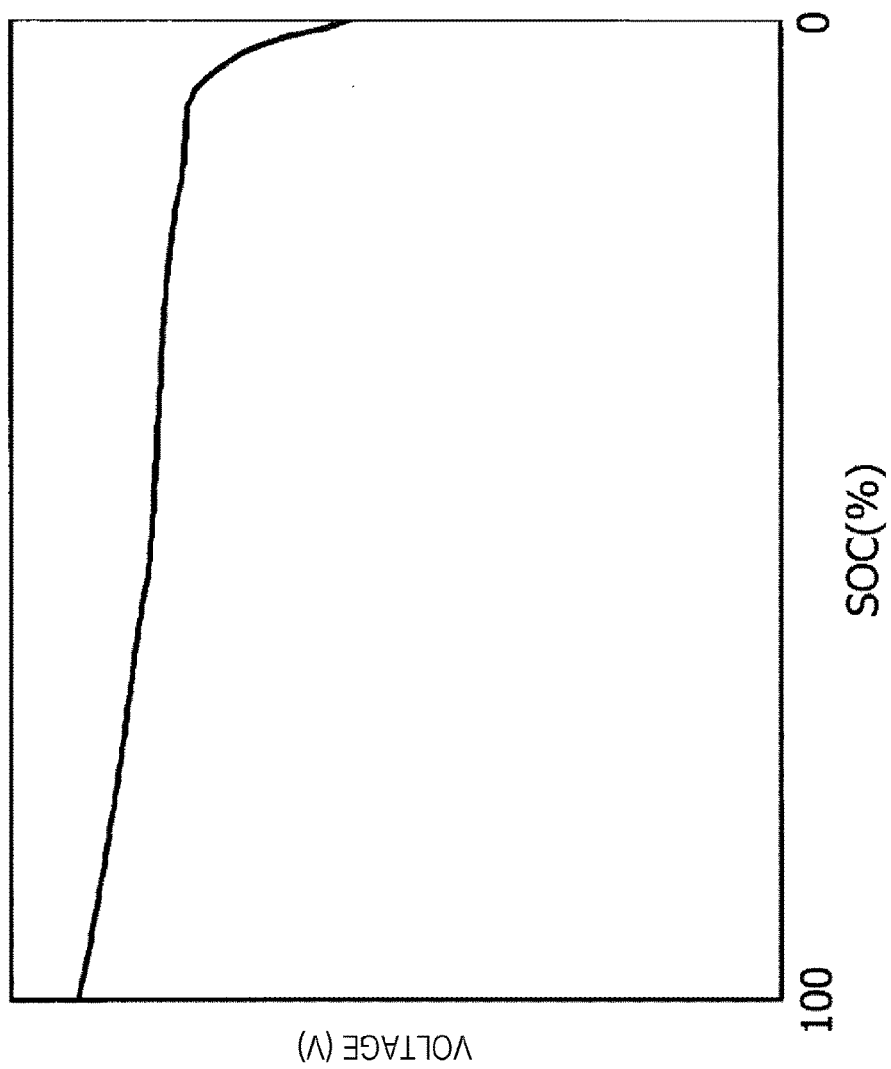
FIG. 9 is a diagram (SOC-V curve) illustrating a relation of a state of charge (SOC) of a battery pack and a battery voltage (Voltage).

In step S022, a command to charge the battery pack 41 to SOC 100% and discharge the battery pack 41 to SOC 0% is transmitted from the battery controller 52 to the cell controller 51. The cell controller 51 calculates values of a charge current and a discharge current, on the basis of the voltage and the temperature of the battery pack 41, and charges the battery pack 41 to SOC 100% with the calculated charge current. Then, the cell controller 51 discharges the battery pack 41 to SOC 0% with the calculated discharge current. A relation (SOC-V curve) of the SOC and the battery voltage (Voltage) illustrated in FIG. 9 is obtained by measuring the voltage and the current at the time of the discharge. At this time, the discharge current preferably has a value smaller than a normal value. Specifically, the discharge current is preferably 0.1 C or less and is more preferably 0.05 C or less.

In addition, a control method to discharge the battery pack 41 with the small discharge current value as described above only in the vicinity of the standard SOC of the characteristic at the time of discharging the battery pack 41, specifically, an SOC range of ±4% may be included as a preferred example. In addition, the obtained SOC-V curve is stored in the data recording unit 521 in the battery controller 52.

Figure 10:
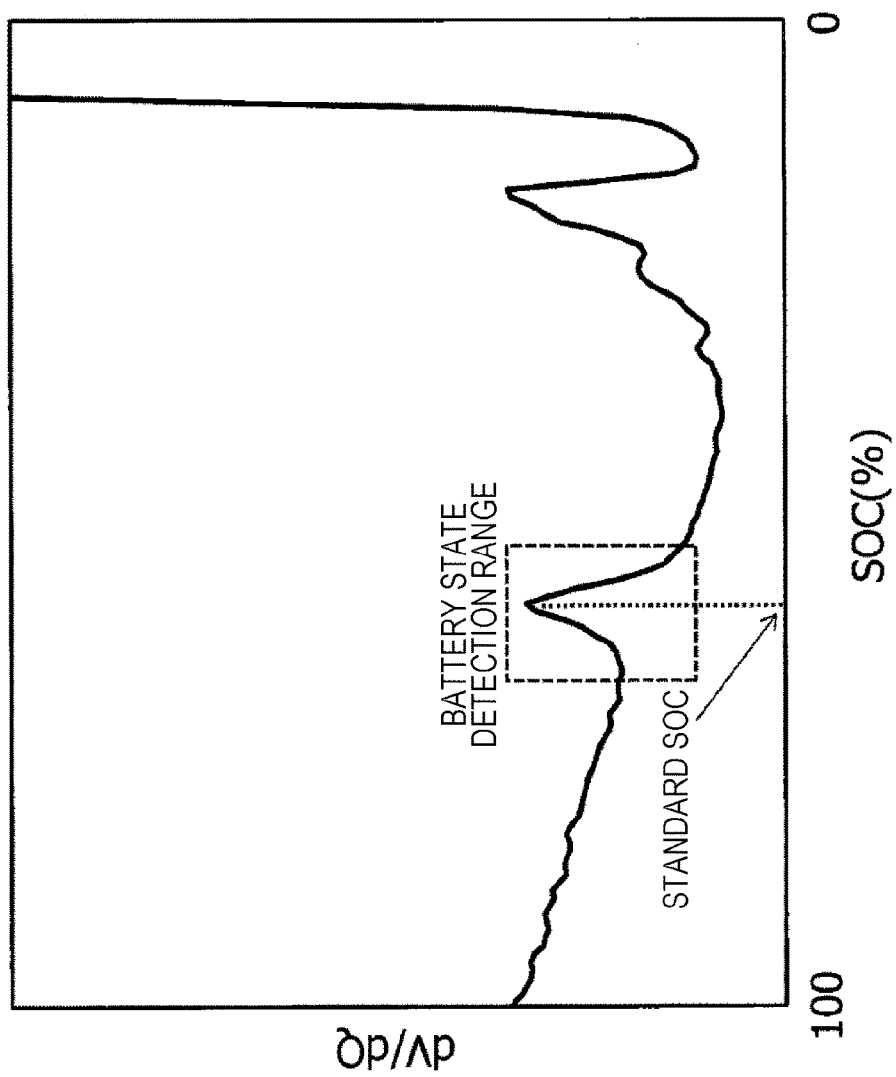
FIG. 10 is a diagram (SOC-dV/dQ curve) illustrating a discharge differential curve of the battery pack.

Next, in step S023, the battery state operation unit 522 in the battery controller 52 calculates a discharge differential curve (SOC-dV/dQ) illustrated in FIG. 10, from the SOC-V curve illustrated in FIG. 9. In step S024, a peak shape of a dV/dQ curve with respect to the SOC and an SOC in which the dV/dQ curve shows a peak value are calculated by the battery state operation unit 522 in the battery controller 52. The SOC is set as the standard SOC.

In step S025, the peak shape of dV/dQ and the standard SOC are transmitted from the battery state operation unit 522 in the battery controller 52 to the data recording unit 521 in the battery controller 52 and are stored in the data recording unit 521. In step S026, the reselection of the standard SOC ends.

As described above, according to this embodiment, in the secondary battery system in which the N secondary battery modules 50-1 to 50-N are connected in parallel, the state of the battery pack 41 is detected by the cell controller 51 of each secondary battery module and the state of charge (SOC) of the battery pack 41 is compared with the standard SOC. If the SOC of the battery pack 41 is higher than the standard SOC, the battery pack 41 is discharged to the SOC lower than the standard SOC, so that the degradation of the battery capacity of the battery 10 is suppressed. Therefore, a secondary battery system having a long life can be provided.

In the first embodiment, the upper controller (not illustrated in the drawings) has the determiner (not illustrated in the drawings). However, the battery controller 52 may have the determiner.

Second Embodiment

Figure 11:
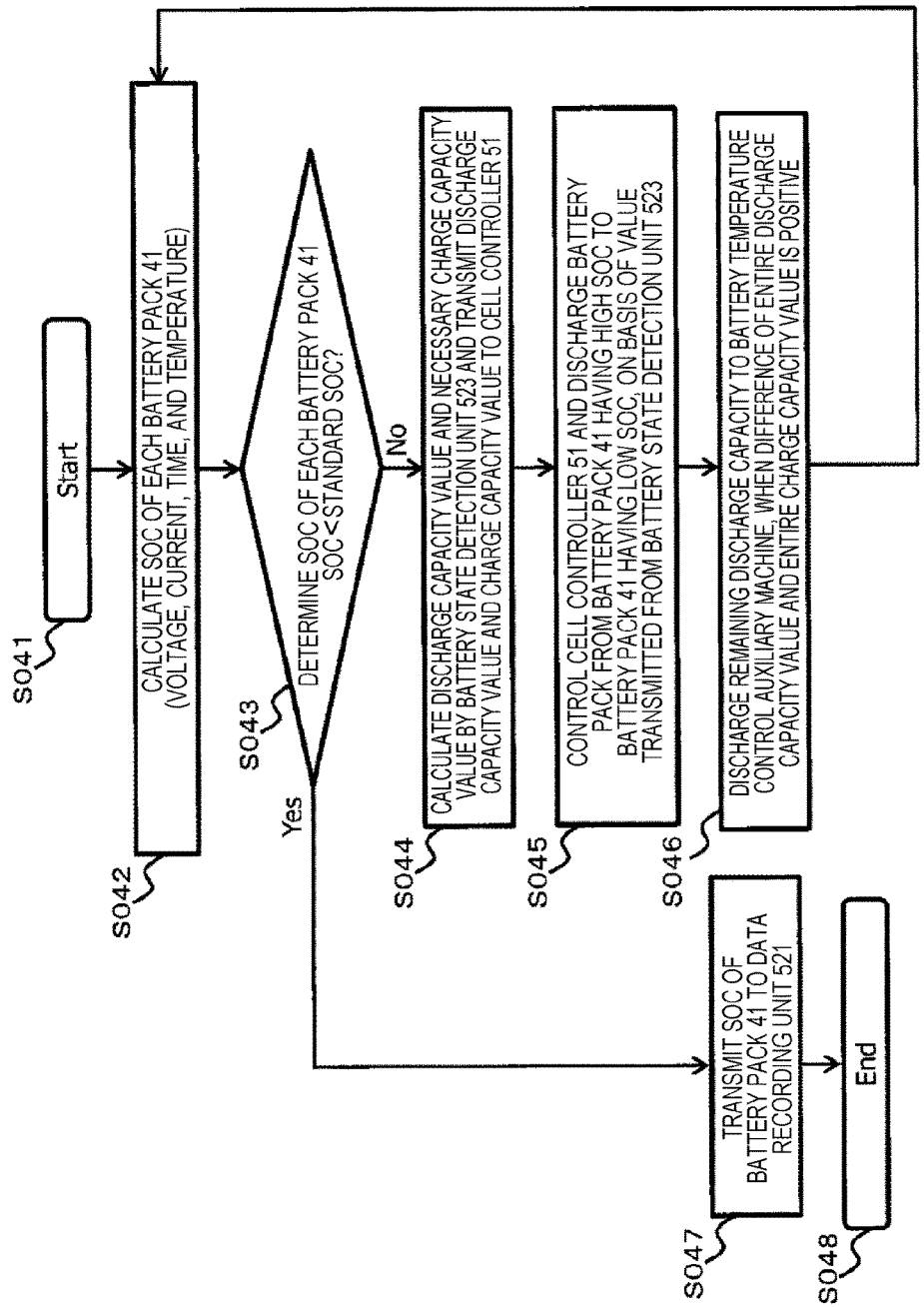
FIG. 11 is a system flow diagram according to a second embodiment.

A secondary battery system according to a second embodiment is mounted on a hybrid electric vehicle, a plug-in hybrid electric vehicle, and an electric vehicle. In the second embodiment, the number of secondary battery modules illustrated in FIG. 5 is plural. That is, in secondary battery modules 50-1 to 50-N, N is an integer of 2 or more. FIG. 11 illustrates a process sequence of charge/discharge control executed by a battery controller 52 of the secondary battery system according to the second embodiment. The second embodiment is the same as the first embodiment, except for the number of secondary battery modules illustrated in FIG. 5 being plural at all times and the charge/discharge control process of FIG. 11, and description thereof is omitted.

When a non-charge period or a non-discharge period is continued for a predetermined period or more, a signal is sent from a cell controller 51 to the battery controller 52. In this case, when a stop state is continued for several seconds to several minutes, due to a traffic jam or waiting at a stoplight, this signal is not sent. When doors of a vehicle are locked in a state in which an engine stops, a signal is sent from the cell controller 51 to the battery controller 52 (step S041).

In step S042, a battery state operation unit 522 in the battery controller 52 calculates an SOC of a battery pack 41, on the basis of each data of a battery voltage V detected by a voltage detector 42, a discharge current I detected by a current detector 43, and a battery temperature T detected by a temperature detector 44.

In step S043, a battery state detection unit 523 in the battery controller 52 compares the SOC of the entire battery packs 41 calculated by the battery state operation unit 522 and a standard SOC. When the SOC of the entire battery packs 41 is lower than the standard SOC, the battery state detection unit 523 determines a comparison result as Yes and the process proceeds to step S047. If the SOC of the entire battery packs 41 is not lower than the standard SOC, the process proceeds to step S044.

In step S044, the battery state detection unit 523 in the battery controller 52 calculates a discharge capacity value in which the SOC of the battery pack 41 becomes a target SOC lower than the standard SOC and calculates a charge capacity value in which the SOC of the battery pack 41 of the SOC lower than the standard SOC becomes the target SOC, from a difference of the SOC of each battery pack 41 and the standard SOC, and transmits the calculated discharge capacity value or charge capacity value to each cell controller 51.

In step S045, the cell controller 51 discharges or charges the battery pack 41, on the basis of the discharge capacity value and the charge capacity value transmitted from the battery state detection unit 523. At this time, the discharge is performed from the battery pack of the SOC higher than the standard SOC to the battery pack of the SOC lower than the standard SOC.

In step S046, the battery state detection unit 523 in the battery controller 52 calculates a difference of a discharge capacity value of the entire battery packs 41 and a charge capacity value of the entire battery packs 41. When a value obtained by subtracting the charge capacity value from the discharge capacity value is positive, a surplus is generated in a battery capacity. In this case, the surplus is discharged to an auxiliary machine executing temperature control of the battery system or a different battery (lead battery for starting an engine).

After the discharge is completed, the process proceeds to step S042 and the SOC of each battery pack 41 is calculated. After the process proceeds to step S043, the determination is performed again.

In step S047, a value of the SOC of each battery pack is transmitted to the data recording unit 521 in the battery controller 52 and the process proceeds to step S048. In step S048, control of the battery controller 52 ends.

As described above, according to the second embodiment, in a moving object system (vehicle), such as the hybrid vehicle, the plug-in hybrid vehicle, and the electric vehicle, on which the secondary battery system according to the present invention can be mounted, a state of the battery pack 41 is detected by the battery controller 51 and a state of charge (SOC) of the battery pack 41 is compared with the standard SOC. If the SOC of the battery pack 41 is higher than the standard SOC, the battery pack 41 is discharged to the target SOC lower than the standard SOC, so that the degradation of the battery capacity of the battery 10 is suppressed. Therefore, a secondary battery system having a long life can be provided.

Third Embodiment

A secondary battery system according to a third embodiment is mounted on a hybrid electric vehicle, a plug-in hybrid electric vehicle, and an electric vehicle on which a car navigation system is mounted.

When a vehicle arrives at a destination set to the car navigation system, it is general to stop the vehicle (moving object system) at the destination. In a state in which the vehicle stops, a state of charge of a battery in the secondary battery system is generally maintained. For this reason, when an SOC at the time of the stop is higher than a standard SOC, this causes degradation of a battery capacity. Although described in detail below, the invention according to this embodiment can prevent the degradation of the battery capacity in such a state.

Hereinafter, a process sequence in the secondary battery system according to the third embodiment will be described using FIGS. 12 and 13.

Figure 12:
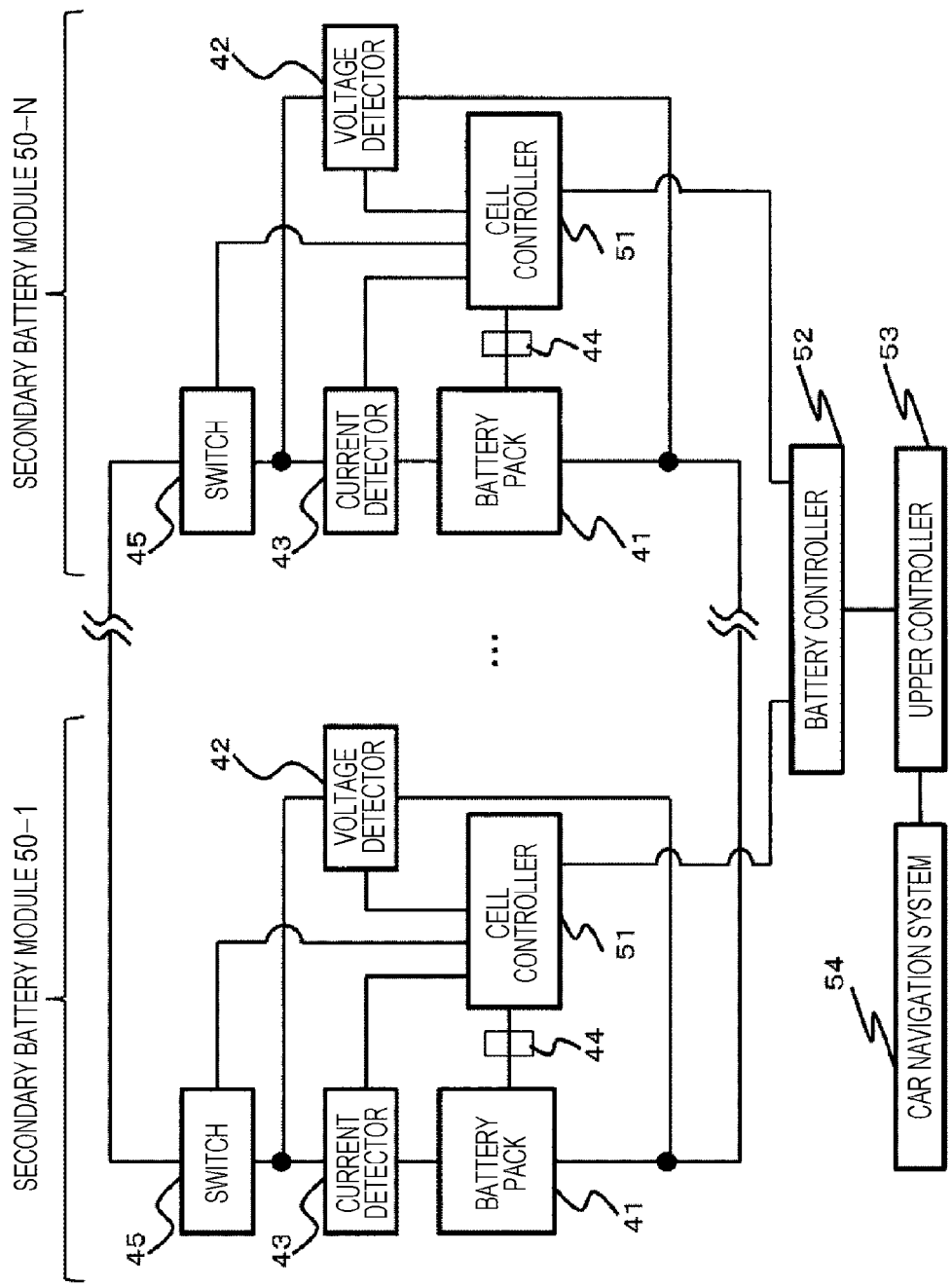
FIG. 12 is a schematic configuration diagram of a system obtained by adding a car navigation system to the secondary battery system according to the present invention.

FIG. 12 is a schematic configuration diagram of a system obtained by adding an upper controller 53 and a car navigation system 54 to the secondary battery system illustrated in FIG. 5. The upper controller 53 is connected to a battery controller 52 and the car navigation system 54 is connected to the upper controller 53. The upper controller 53 has a determiner (not illustrated in the drawings) to determine a use state of the future of a battery pack 41.

Figure 13:
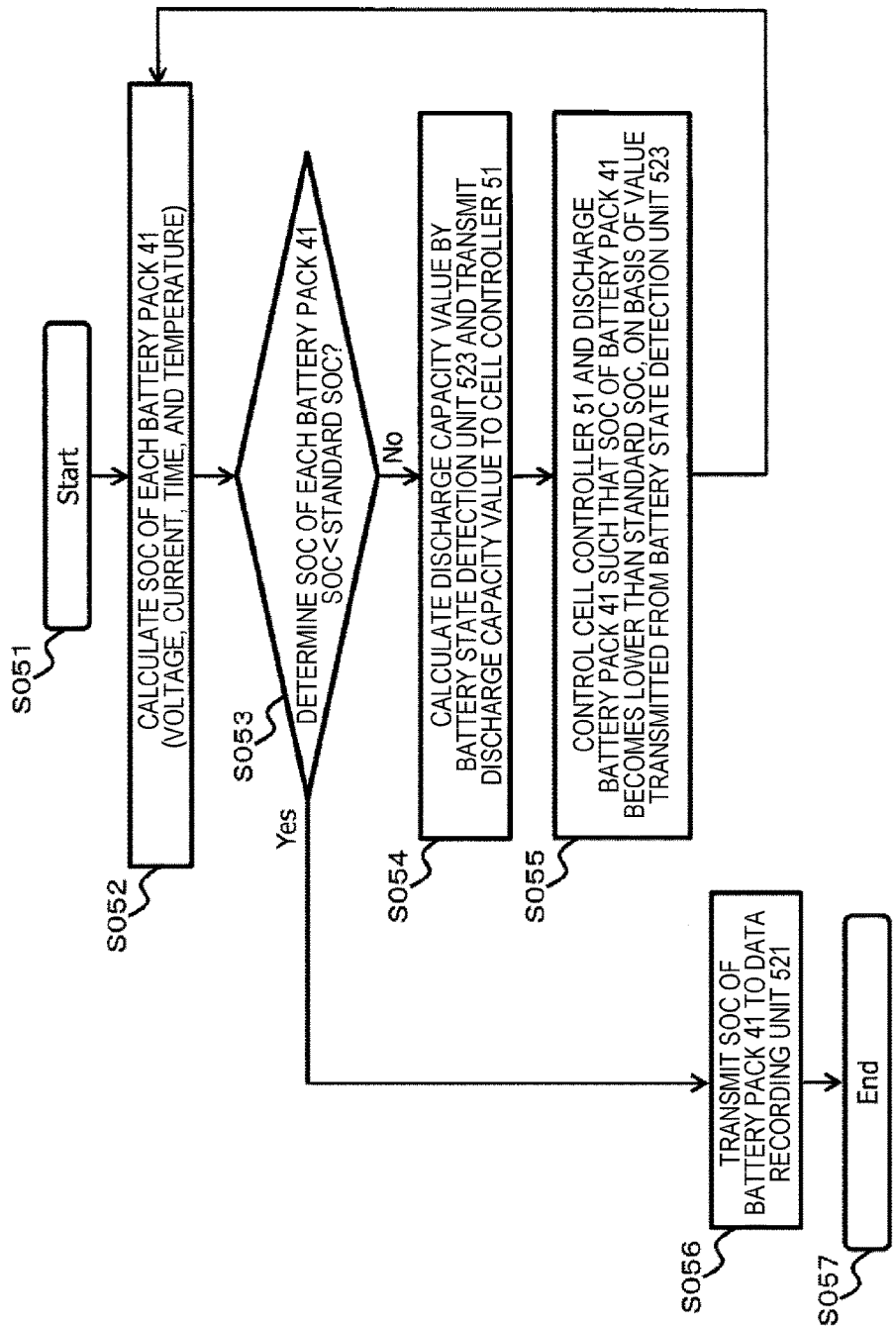
FIG. 13 is a system flow diagram according to a third embodiment.

FIG. 13 illustrates a process sequence of charge/discharge control executed by the battery controller 52 of the secondary battery system according to the third embodiment. The third embodiment is the same as the first embodiment, except for the charge/discharge control process of FIG. 13, and description thereof is omitted. In step S051, when the vehicle comes close to the destination previously set to the car navigation system 54, position information is transmitted from the car navigation system 54 to the upper controller 53 and the determiner of the upper controller 53 determines that the battery pack 41 is not used in the near future and transmits a command regarding charge/discharge of the battery pack 41 to the battery controller 52.

In step S052, a battery state operation unit 522 in the battery controller 52 calculates an SOC of each battery pack 41, on the basis of each data of a battery voltage V detected by a voltage detector 42, a discharge current I detected by a current detector 43, and a battery temperature T detected by a temperature detector 44.

In step S053, a battery state detection unit 523 in the battery controller 52 compares the SOC of the entire battery packs 41 calculated by the battery state operation unit 522 and a standard SOC. When the SOC of the entire battery packs 41 is lower than the standard SOC, the battery state detection unit 523 determines a comparison result as Yes and the process proceeds to step S047. If the SOC of the entire battery packs 41 is not lower than the standard SOC, the battery state detection unit 523 determines the comparison result as No and the process proceeds to step S054.

In step S054, the battery state detection unit 523 in the battery controller 52 calculates a discharge capacity value in which the SOC of the battery pack 41 becomes a target SOC lower than the standard SOC, from a difference of the SOC of each battery pack 41 and the standard SOC, and transmits the calculated discharge capacity value to each cell controller 51.

In step S055, the cell controller 51 discharges the battery pack 41, on the basis of the discharge capacity value transmitted from the battery state detection unit 523. After the discharge is completed, the process proceeds to step S052 and the SOC of each battery pack 41 is calculated. After the process proceeds to step S053, the determination is performed again. When the comparison result of step S053 is Yes, a value of the SOC of each battery pack is transmitted to a data recording unit 521 in the battery controller 52 in step S056 and the process proceeds to step S057. In step S057, control of the battery controller 52 ends.

As described above, according to the third embodiment, in the moving object system in which an in-vehicle information system such as the car navigation system is mounted on the hybrid electric vehicle, the plug-in hybrid electric vehicle, and the electric vehicle on which the secondary battery system according to the present invention is mounted, when the vehicle comes close to the destination, a state of the battery pack 41 is detected by the battery controller 51 and the SOC of the battery pack 41 is compared with the standard SOC. If the SOC of the battery pack 41 is higher than the standard SOC, the battery pack 41 is discharged to the target SOC lower than the standard SOC, so that the degradation of the battery capacity of the battery 10 is suppressed. Therefore, a secondary battery system having a long life can be provided.

That is, in the third embodiment, when the vehicle comes close to the destination, in the case in which it is determined that the SOC of any battery pack 41 is equal to or higher than the standard SOC, the battery controller 51 instructs the cell controller 52 to execute discharge control such that the SOC of the battery pack 41 becomes the target SOC lower than the standard SOC. According to the instruction, the cell controller 52 executes the discharge control of the single battery 10 of the SOC equal to or higher than the standard SOC, among the single batteries 10 configuring the battery pack 41.

When the SOC of the entire battery packs 41 does not become lower than the standard SOC until the vehicle arrives at the destination, the discharge control of the battery pack 41 may be continuously performed, even though the vehicle stops. However, when a difference between the SOC of the battery pack 41 and the target SOC lower than the standard SOC is large, the discharge control may be continuously executed for a long time in spite of the vehicle stop. Therefore, it is necessary to consider whether the SOC is reduced to the standard SOC while the vehicle travels to the destination, as timing when it is determined whether the battery pack 41 of which the SOC is higher than the standard SOC exists.

In the third embodiment, the upper controller 53 has the determiner (not illustrated in the drawings). However, the battery controller 52 may have the determiner.

Fourth Embodiment

In a fourth embodiment, a secondary battery system mounted on a moving object system such as a hybrid electric vehicle, a plug-in hybrid vehicle, and an electric vehicle cooperates with an energy management system (EMS) such as a home energy management system (HEMS). A charge/discharge control method of a battery controller 52 of the secondary battery system will be described. In addition, description of the same configuration as the configuration of the first embodiment is omitted.

A charge plug of the EMS is plugged in a feeding unit of the secondary battery system according to the fourth embodiment and an SOC of the secondary battery system is controlled by the EMS. In addition, charge/discharge of the secondary battery system is controlled on the basis of a power use schedule previously set to the EMS.

Hereinafter, the fourth embodiment will be described using FIGS. 14 to 16.

Figure 14:
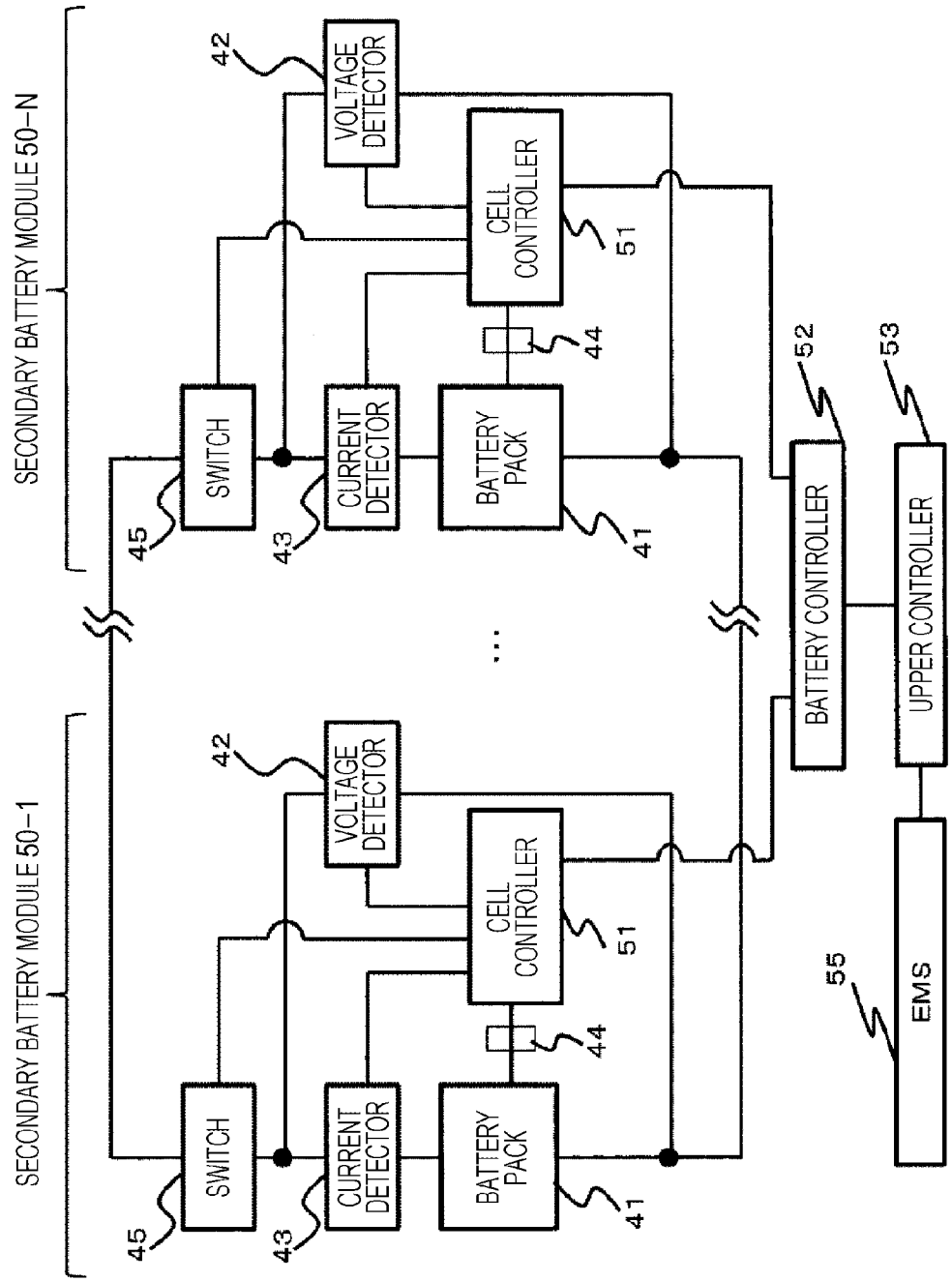
FIG. 14 is a schematic configuration diagram of a system obtained by adding an EMS to the secondary battery system according to the present invention.

FIG. 14 is a schematic configuration diagram of a system obtained by adding an upper controller 53 and an EMS 55 to the secondary battery system illustrated in FIG. 5. The upper controller 53 is connected to the battery controller 52 and the EMS 55 is connected to the upper controller 53. The upper controller 53 has a determiner (not illustrated in the drawings) to determine a use state of the future of a battery pack 41.

Figure 15:
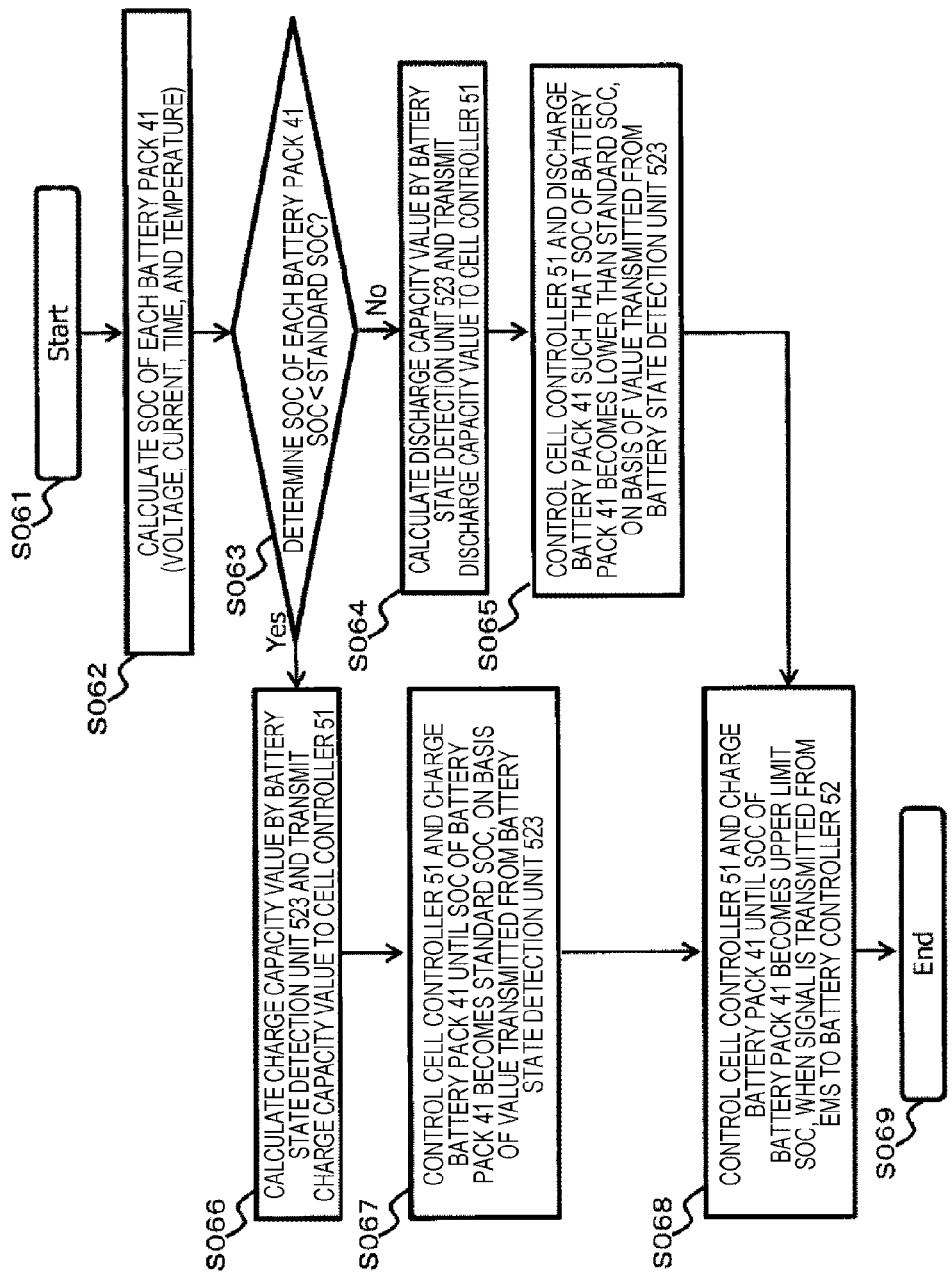
FIG. 15 is a system flow diagram according to a fourth embodiment.

FIG. 15 is a flow diagram of the secondary battery system according to this embodiment. FIG. 16 is a diagram illustrating an example of a charge method of a secondary battery according to this embodiment with a charge method according to the related art and corresponds to a flow of steps S063, S066, S067, and S068 of FIG. 15.

An outline of the present invention will be described using FIG. 16. In a graph illustrated in FIG. 16, periods 1 to 3 are shown at a time axis to be a horizontal axis and a standard SOC and a prescribed upper limit SOC are shown at an SOC axis to be a vertical axis.

In the period 1, charge is performed to the standard SOC with the same electric amount. If an SOC becomes the standard SOC, the charge stops once. In addition, if a time becomes a predetermined time earlier than a prescribed scheduled time, the charge is performed to the upper limit SOC. In the related art, the charge is performed to increase the SOC to the upper limit SOC.

The charge method according to the fourth embodiment is used, so that a time for which the SOC is maintained at an SOC higher than the standard SOC decreases, as compared with the charge method according to the related art. Therefore, the degradation of a battery capacity can be prevented.

A process sequence for charging the secondary battery system according to the fourth embodiment according to a charge characteristic illustrated in FIG. 16 will be described with reference to FIG. 15.

In a process of FIG. 15, if the charge plug of the EMS 55 is plugged in a charge unit of the secondary battery system, a use schedule of a vehicle is transmitted from the EMS 55 to the upper controller 53, the determiner (not illustrated in the drawings) of the upper controller 53 grasps a use state of the future of the secondary battery system, on the basis of the use schedule of the vehicle, and an energy management command signal is transmitted from the upper controller 53 to a battery controller 51 (step S061).

In step S062, a battery state operation unit 522 in the battery controller 52 calculates an SOC of each battery pack 41, on the basis of each data of a battery voltage V detected by a voltage detector 42, a discharge current I detected by a current detector 43, and a battery temperature T detected by a temperature detector 44.

In step S063, a battery state detection unit 523 in the battery controller 52 compares the SOC of the entire battery packs 41 calculated by the battery state operation unit 522 and the standard SOC. When the SOC of the entire battery packs 41 is lower than the standard SOC, the battery state detection unit 523 determines a comparison result as Yes and the process proceeds to step S066. If the SOC of any one battery pack 41 of the entire battery packs 41 is equal to or higher than the standard SOC, the battery state detection unit 523 determines the comparison result as No and the process proceeds to step S064.

In step S064, the battery state detection unit 523 in the battery controller 52 calculates a discharge capacity value in which the SOC of the battery pack 41 becomes a target SOC lower than the standard SOC, from a difference of the SOC of each battery pack 41 and the standard SOC, and transmits the calculated discharge capacity value to each cell controller 51.

In step S065, the cell controller 51 discharges the battery pack 41, on the basis of the discharge capacity value transmitted from the battery state detection unit 523. At this time, a power supply of the EMS connection destination and a storage battery for domestic use connected to the EMS are preferable as the feeding destination of discharged electricity, from the viewpoint of energy efficiency. If the discharge is completed to the discharge capacity value, the process proceeds to step S068.

In step S066, the battery state detection unit 523 in the battery controller 52 calculates a charge capacity value in which the SOC of the battery pack 41 becomes the standard SOC, from a difference of the SOC of each battery pack 41 and the standard SOC, and transmits the calculated charge capacity value to each cell controller 51.

In step S067, the cell controller 51 charges the battery pack 41, on the basis of the charge capacity value transmitted from the battery state detection unit 523. If the charge is completed to the transmitted charge capacity value, the process proceeds to step S068.

In step S068, in the case in which next use date and time of the moving object system are input from a user to the EMS, if use scheduled date and time approach, a signal is transmitted from the EMS to the battery controller 52, a charge amount of the battery pack 41 necessary for increasing the SOC to the prescribed upper limit SOC is calculated, and a charge capacity value is transmitted to each cell controller 51. Each cell controller 51 charges each battery pack 41, on the basis of the transmitted charge capacity value. If the charge is completed to the charge capacity value, the process proceeds to step S069 and ends.

The use schedule of the vehicle on which the secondary battery system according to the fourth embodiment is mounted is set by a scheduler of the EMS represented by the HEMS. In addition, the battery pack 41 of the secondary battery system mounted on the vehicle is charged while a vehicle parks in a garage. The SOC of the battery pack 41 is set to be lower than the standard SOC until a next vehicle use scheduled time approaches and the charge starts at a time to be the predetermined time earlier than the use scheduled time, that is, a previous time by a time necessary for performing the full charge from the standard SOC. As a result, the degradation of the battery pack 41 can be suppressed as described above.

Modification of Fourth Embodiment

Figure 16:
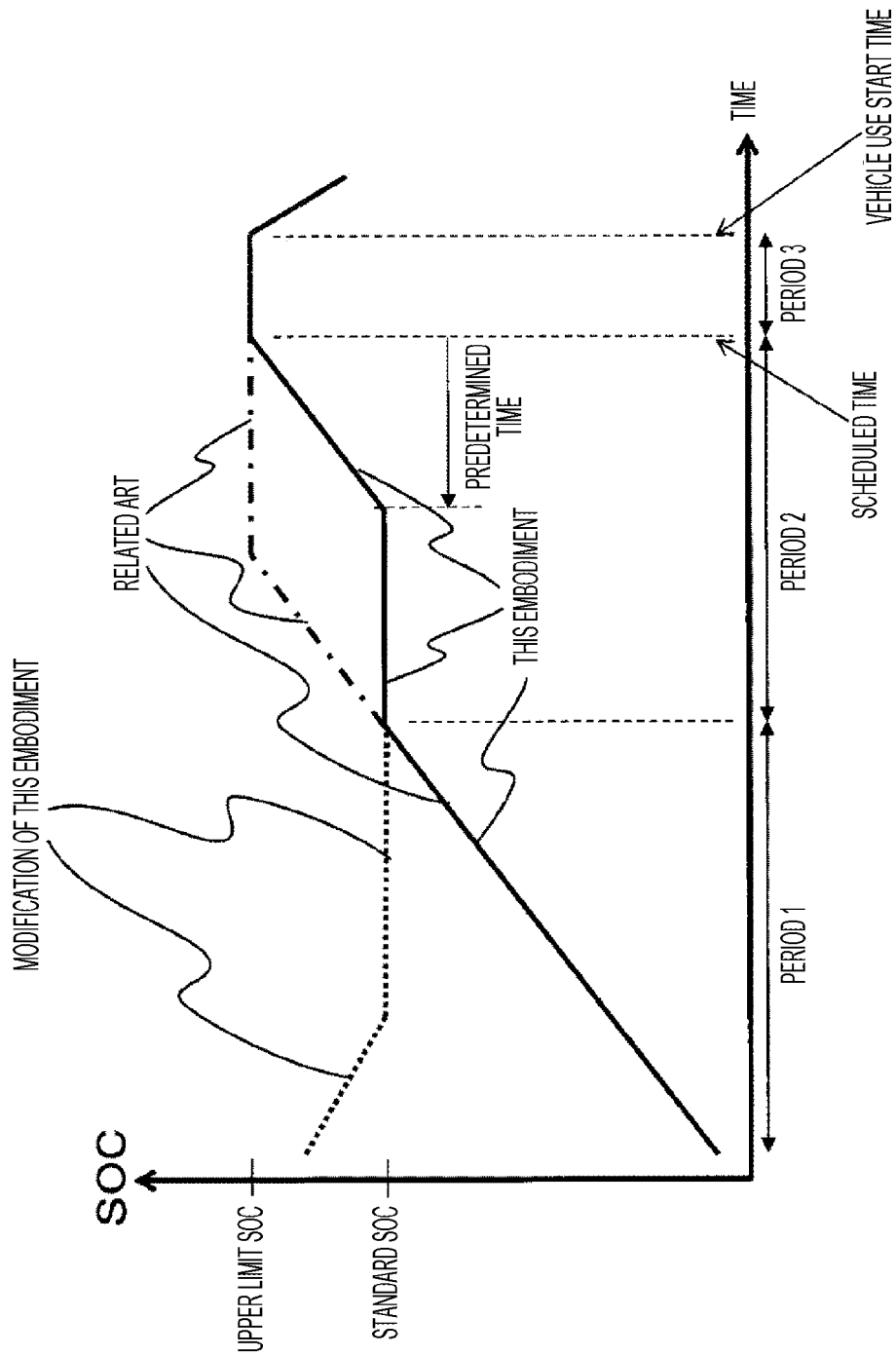
FIG. 16 is a diagram illustrating an example of a charge method according to the fourth embodiment.

Charge/discharge control according to a modification of the fourth embodiment is illustrated in FIG. 16. When a moving object on which the secondary battery system is mounted is connected to the EMS 55, the SOC of the battery pack 41 in the fourth embodiment is equal to or lower than the standard SOC. Meanwhile, the SOC of the battery pack 41 in the modification of the fourth embodiment is equal to or higher than the standard SOC.

In the modification of the fourth embodiment, if the moving object on which the secondary battery system is mounted is connected to the EMS 55, the battery controller 52 executes the discharge control such that the SOC of the battery pack 41 equal to or higher than the standard SOC becomes the standard SOC. After the SOC becomes the standard SOC, the same charge control as the charge control of the fourth embodiment is executed. Therefore, a difference of the fourth embodiment and the modification thereof is only the period 1.

In the fourth embodiment and the modification thereof, the upper controller 53 has the determiner (not illustrated in the drawings). However, the battery controller 52 may have the determiner.

The present invention is not limited to the embodiments and changes and combinations can be appropriately applied without departing from the scope thereof. For example, the battery is the wound lithium ion secondary battery. However, the present invention may be applied to a laminated lithium ion secondary battery obtained by laminating a plurality of positive electrode plates and a plurality of negative electrode plates alternately with separators therebetween.

REFERENCE SIGNS LIST

10 battery
11 positive electrode plate
12 negative electrode plate
13 separator
22 wound electrode group
26 battery container
41 battery pack
42 voltage detector
43 current detector
44 temperature detector
51 cell controller
52 battery controller
53 upper controller
54 car navigation system
55 EMS

The invention claimed is:

1. A secondary battery system for controlling charge/discharge of one or more battery packs, wherein a negative electrode active material of each of the battery packs is a material having a first potential stabilized phase and a second potential stabilized phase of a state of charge (SOC) lower than an SOC of the first potential stabilized phase as stabilized phases in which a potential with respect to the SOC is stable, the secondary battery system comprising:
   a standard setting device configured to select a standard SOC for a first battery pack based on a peak value of a discharge differential curve for the first battery pack; and
   an SOC control device for discharging the first battery pack such that the SOC of the first battery pack is brought into a range of the second potential stabilized phase when the first battery pack is brought into a non-use state based on the standard SOC that is selected by the standard setting device and the current SOC of the first battery pack.

2. The secondary battery system according to claim 1, wherein, when the secondary battery system includes a second battery pack, the SOC control device is configured to discharge the first battery pack into the second battery pack.

3. The secondary battery system according to claim 1, wherein:
   the SOC control device is further configured to detect that the first battery pack is to be brought into a non-use state at a predetermined time in the future, and
   the SOC control device begins discharging the first battery pack before the predetermined time so that the SOC of the first battery pack is brought into the range of the second potential stabilized phase by the predetermined time.

4. The secondary battery system according to claim 1, wherein:
   when the first battery pack is part of a vehicle, the SOC control device is further configured to receive a signal indicating that the vehicle is approaching a destination, and detect that the first battery pack is to be brought into a non-use state based on the signal, and
   the SOC control device begins discharging the first battery pack before the vehicle arrives at the destination, such that the SOC of the first battery pack is brought into the range of the second potential stabilized phase when the vehicle arrives at the destination.

5. The secondary battery system according to claim 1, wherein, the SOC control device is further configured to begin charging the first battery pack at a first time that is earlier than a second time when the first battery pack is to be brought into a use state, such that the SOC of the first battery pack is brought into a range of the first potential stabilized phase before the second time.

6. The secondary battery system according to claim 5, wherein, when the first battery pack is part of a vehicle having an energy management system, the SOC control device is further configured to receive an indication of the second time from the energy management system, the second time being a time when the vehicle is scheduled to begin moving.

\* \* \* \* \*